S. G. BAITS AND S. I. FEKETE.
TRACTOR.
APPLICATION FILED FEB. 2, 1918.

1,342,934.

Patented June 8, 1920.

INVENTORS:
Stuart G. Baits & Stephen I. Fekete
by MacLeod Calhn Copeland & Dike
Attys.

UNITED STATES PATENT OFFICE.

STUART G. BAITS AND STEPHEN I. FEKETE, OF DETROIT, MICHIGAN, ASSIGNORS TO HUDSON MOTOR CAR COMPANY, OF DETROIT, MICHIGAN, A CORPORATION OF MICHIGAN.

TRACTOR.

1,342,934.  Specification of Letters Patent.  Patented June 8, 1920.

Application filed February 2, 1918. Serial No. 215,026.

*To all whom it may concern:*

Be it known that we, STUART G. BAITS and STEPHEN I. FEKETE, both citizens of the United States, and both residing at Detroit, county of Wayne, State of Michigan, have invented a certain new and useful Improvement in Tractors, of which the following is a specification, reference being had therein to the accompanying drawings.

This invention has for its object a new and improved farm tractor for use in both field and road work. One of the objects of my invention is to produce a tractor having good stability combined with minimum weight and maximum tractive force. Another object is to afford an efficient means for transmitting to the wheels the power produced by the engine.

The invention will be fully understood from the following description, when taken in connection with the accompanying drawings and the novel features thereof will be pointed out and clearly defined in the claim at the close of this specification.

Figure 1:
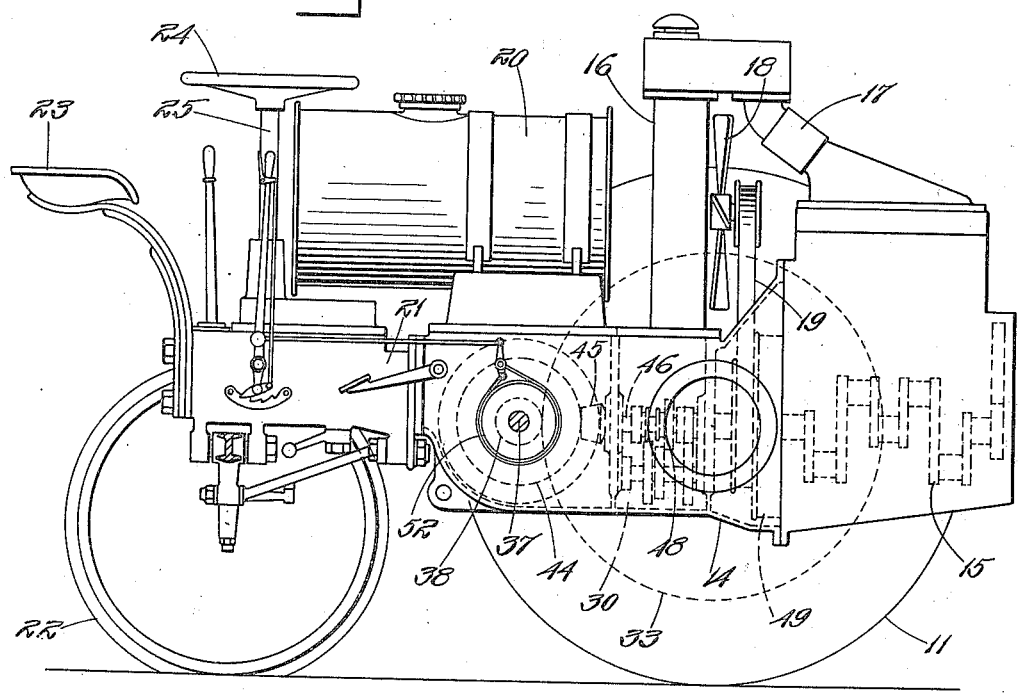

In the drawings Figure 1 is a side elevation partly in section of a tractor embodying our invention.

Figure 2:
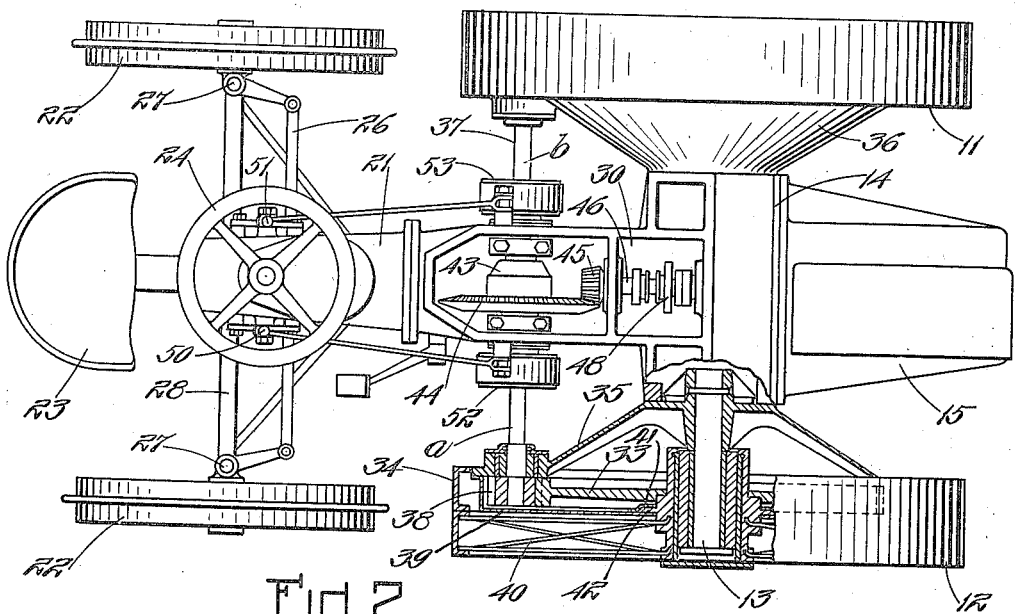

Fig. 2 is a top plan view of the tractor shown in Fig. 1.

Referring now to the drawings, at 11 and 12 are shown two driving wheels mounted on stub axles 13, secured to a frame 14. The engine 15 is located on the frame 14 in front of the stub axles 13. At 16 is shown a radiator connected to the engine by the pipe 17. A fan operated by a belt 19 is shown at 18. At 20 is shown the fuel tank. Secured to the frame, is a rearwardly extending member 21 conveniently called a "reach". Beneath this member is located a pair of steering wheels or rear wheels 22 which in effect constitute a truck. While it is preferred to use a rear truck having two wheels, it will be understood that a truck having a single wheel may be employed, without departing from the spirit of our invention. Primarily the function of the rear truck is to take the reaction from the driving wheels, but it also, in the embodiment of our invention shown in the drawings and described herein, serves to steer the machine.

The operator's seat is shown at 23 and the steering wheel at 24. The steering wheel 24 is connected with the steering column 25 and actuates the rear wheels 22 by a rod 26 connected to steering knuckles 27 which are themselves tied together by a tie rod 28. At 30 is shown a transmission box and a differential housing forming part of the frame of the machine.

It will be seen from the foregoing that the load of the heavy parts of a tractor is borne chiefly by the front wheels since the weight of the engine which is forward of the axles is substantially balanced by the weight of the transmission, radiator and gasolene tank, all of which are located at the rear of the front axles.

The driving wheels 11 and 12 are each provided with a driving gear 33 preferably of the external or spur type. This driving gear 33 is located within the wheel, there being a flange 34 formed by the tire which extends over the said gear. Adjacent the driving gear is located a fixed portion 35 of the frame, this member being circular in shape, and together with the corresponding member 36 on the opposite side of the machine affording a support for a cross shaft 37. On each side of this cross shaft 37 is carried a spur pinion 38 which meshes with the driving gear 33. The driving gear 33 and the pinion 38 together form a reducing gear by means of which the driving wheels are caused to travel more slowly than the cross shaft 37. The driving gear is inclosed within an annular dust case 39 secured to the edge of the member 35 and extending inwardly between the spokes 40 of the wheel and the driving pinion 33. The dust case 39 terminates near the hub in a flange portion 41 inclosing a ring 42 fixed to the hub of the wheel. The dust case is filled with oil to a predetermined level so that this portion of the transmission gear is kept constantly lubricated.

The cross shaft 37 is preferably made in two parts $a$ and $b$ connected by a differential, the casing of which is indicated at 43, and which need not be described in detail as it is of any well-known construction. The cross shaft 37 carries a beveled gear 44 with which meshes a bevel pinion 45 mounted on the rear end of a shaft 46. The bevel gear 44 and pinion 45 together form a second reduction gear. At 48 is shown a transmission gear which may be of any well known construction, although we prefer to employ an ordinary sliding gear transmission such as is commonly used in automobiles. This transmission is constructed so that the shaft 46 will be driven at engine speed on the direct drive and is further constructed so that two or more additional speed reductions may be had at the will of the driver. Also it affords a reversing gear for use when it is desired to back the machine. At 49 is shown a clutch by means of which the engine may be disconnected when it is desired to let the engine run idle.

It will be seen that there are always two speed reductions between the engine and the driving wheels, namely, that afforded by the beveled gear 44 and pinion 45, and that by the driving gear 33 and spur gear 38; furthermore, that when desired additional speed reductions may be introduced by means of the transmission 48; and that when the machine is operating normally there is a direct drive from the engine to the cross shaft without the interposition of any gearing except the bevel gear 44 and pinion 45. This construction reduces the power loss to a minimum and permits the use of a high speed internal combustion engine having a relatively large range of speed. The two speed reductions in addition to the transmission distribute the bearing pressures over an increased number of points so that at no point is an expensive bearing capable of withstanding heavy loads necessary. In addition, it makes possible the use of a relatively light differential for the force transmitted through it is relatively small.

At 50 and 51 are shown two hand brakes acting on brake drums 52 and 53 on the two halves a and b of the cross-shaft 37. These brakes may be operated independently by the brake levers 54 and 55. These brakes serve a double purpose. They may be used to stop or retard the movement of the tractor on down-grade, or they may be employed to lock the differential or retard the movement of one driving wheel when it is desired to make a sharp turn. By this means the tractor may be caused to turn at right angles. This is often useful in getting the tractor out of a bad place, as well as when necessary to make a sharper turn than the steering wheel would cause the machine to make.

Although, as previously stated, practically all the weight of the machine is balanced on the front axles, thereby greatly improving the tractive power of the machine, its stability is not diminished as the reaction of the spur pinions 38 on the driving gears holds the rear truck on the ground and does not tend to lift it up when going forward. This permits substantially the entire weight of the machine to be concentrated on the front axle thereby increasing the adhesion of the machine, and consequently permits the reduction of the weight to a minimum without affecting the pull which the machine is capable of producing. This arrangement also lessens the tendency of the machine to mire itself when pulling hard on soft ground and increases its ability to climb out of a deep hole. The reversing gear ratio is so chosen that the engine will not exert force to lift the rear end when backing.

The arrangement of parts shown and described herein is also important for other reasons. By having the steering truck in the rear of the driving wheels and having the driving reaction tend to hold the truck on the ground, a machine may be made which while having perfect stability, will have a very short wheel base. In fact the wheel base is limited only by the size of the wheels employed. The machine may therefore be made very short so that it may haul the plows to a point closer to a fence or other obstruction. Furthermore, since the draw-bar is connected at a point below the center of the driving wheels, the reaction caused by the draw-bar pull tends to lessen the pressure of the truck on the ground caused by the driving reaction. This is important because the driving reaction increases when the tractor is pulling hard, as, for instance, in soft ground. Furthermore, the machine is equally stable when going up grade, since the grade does not shorten the lever arm through which the weight of the machine exerted at the center of gravity acts. The short wheel base is further of importance because it gives a short turning radius.

What we claim is:

The improved tractor comprising a frame, a pair of main driving wheels and a truck in the rear of the driving wheels, an internal combustion engine mounted on a portion of the frame which is forward of the center line of the driving wheels, a transmission, differential and fuel tank mounted on a portion of the frame which is rearward of the center line of the driving wheels, a radiator located between the engine and the tank, the weight of the parts being concentrated on the driving wheels, and a draw-bar connection secured to the frame at a point to the rear of and below the center of the driving wheels, the power of said engine being so applied that the reaction of the driving force tends to hold the truck on the ground when going forward while the draw-bar pull tends to counteract said force and to lift the truck off the ground.

In testimony whereof we affix our signatures.

STUART G. BAITS.
STEPHEN I. FEKETE.